Feb. 27, 1945.  W. A. ARNESEN  2,370,514
OPHTHALMOSCOPE
Filed June 16, 1942  5 Sheets-Sheet 1

INVENTOR
WALTER A. ARNESEN
BY
Ramsay, Kent, Chisholm and Lutz
ATTORNEYS

Feb. 27, 1945.   W. A. ARNESEN   2,370,514
OPHTHALMOSCOPE
Filed June 16, 1942   5 Sheets-Sheet 2

INVENTOR
WALTER A. ARNESEN
BY
Ramsey, Kent, Chisholm and Lutz
ATTORNEYS

Feb. 27, 1945.   W. A. ARNESEN   2,370,514
OPHTHALMOSCOPE
Filed June 16, 1942   5 Sheets-Sheet 3

INVENTOR
WALTER A. ARNESEN
BY
Ramsey, Kent, Chisholm and Lutz
ATTORNEYS

Feb. 27, 1945. W. A. ARNESEN 2,370,514
OPHTHALMOSCOPE
Filed June 16, 1942 5 Sheets-Sheet 4

INVENTOR
WALTER A. ARNESEN
BY
Ramsey, Kent, Chisholm and Lutz
ATTORNEYS

Feb. 27, 1945.  W. A. ARNESEN  2,370,514
OPHTHALMOSCOPE
Filed June 16, 1942  5 Sheets-Sheet 5
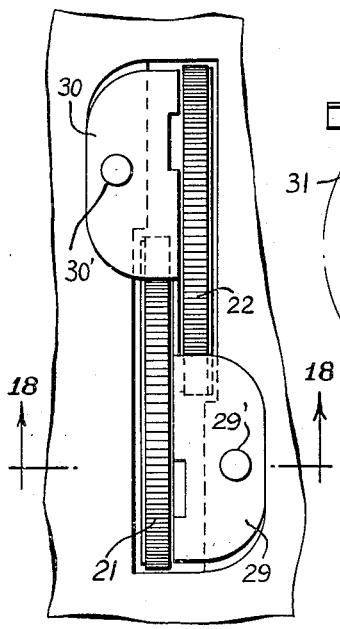
FIG.12.
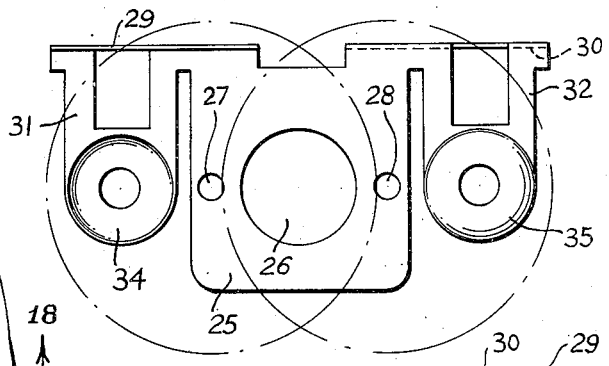
FIG.13.
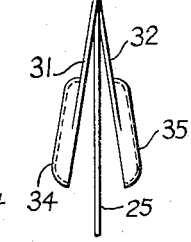
FIG.14.
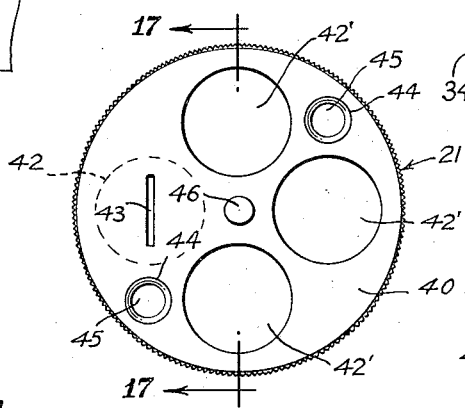
FIG.15.
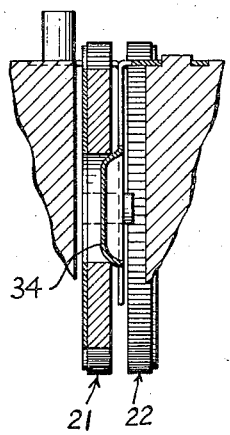
FIG.18.
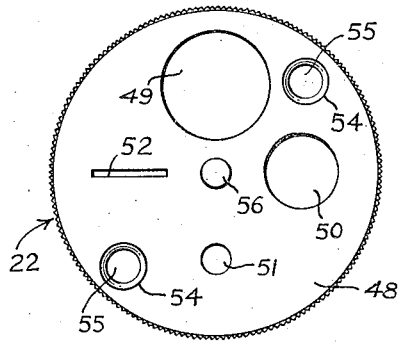
FIG.16.
FIG.17
INVENTOR
WALTER A. ARNESEN
BY
Ramsey, Kent, Chisholm and Lutz
ATTORNEYS Patented Feb. 27, 1945

2,370,514

UNITED STATES PATENT OFFICE 2,370,514

OPHTHALMOSCOPE

Walter A. Arnesen, Flushing, N. Y.

Application June 16, 1942, Serial No. 447,208

15 Claims. (Cl. 88—22)

This invention relates to improvements in diagnostic instruments, and more particularly to improvements in ophthalmoscopes.

An object of the present invention is to provide a new and improved ophthalmoscope in which the housing is provided with a chamber for the reception of a pair of members designed to vary the character of light directed by the ophthalmoscope.

Another object of the invention is to provide an ophthalmoscope in which one housing member has an integral formation providing a chamber for the reception of two overlapping wheel or composite disc members which carry means for varying the character of light directed outwardly by the ophthalmoscope.

Another object of the invention is to provide a simplified amount for such wheels or discs, which mount serves to support the wheels within the chamber of the housing.

Another object of the invention is to provide wheels or discs of composite construction, each of which serves to vary the character of light directed by the instrument.

A further object of the invention is to provide simplified lens disc constructions for the ophthalmoscope.

A further object of the invention is to provide a simplified arrangement for retaining all operating parts of the instrument within the housing.

An additional object of the invention is to provide means for frictionally retaining a lens disc in desired position, together with similar means for preventing tilting of the disc by the first means.

A still further object of the invention is to provide a suitably slotted recess or guideway in a part of one of the housing members for receiving a brow support or other suitable accessory.

Other features, objects and advantages of the invention will be apparent by reference to the following detailed description of the accompanying drawings, wherein:

Fig. 12 is an enlarged view of a fragment of the housing shown in Fig. 9 illustrating the manner in which the amount of the two small discs is introduced into a chamber in the housing;

Fig. 13 is a plan view of this mount;

Fig. 14 is an end view of the same member;

Fig. 15 is a plan view of a composite wheel or disc carried by the mount of Fig. 13;

Fig. 16 is a similar view of the other composite wheel or disc;

Fig. 17 is a section taken substantially on line 17—17 of Fig. 15;

Fig. 18 is a section taken substantially on line 18—18 of Fig. 12;

Figure 1:
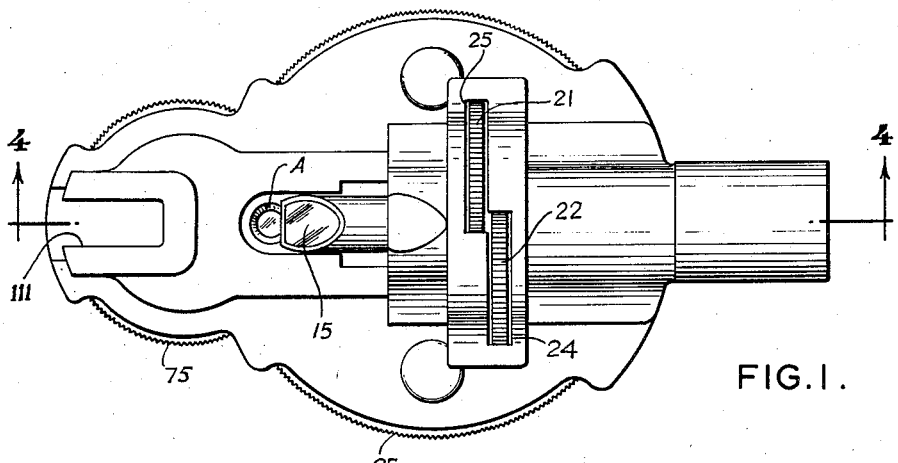
Fig. 1 is a view of the back of an instrument embodying the invention.
Figure 2:
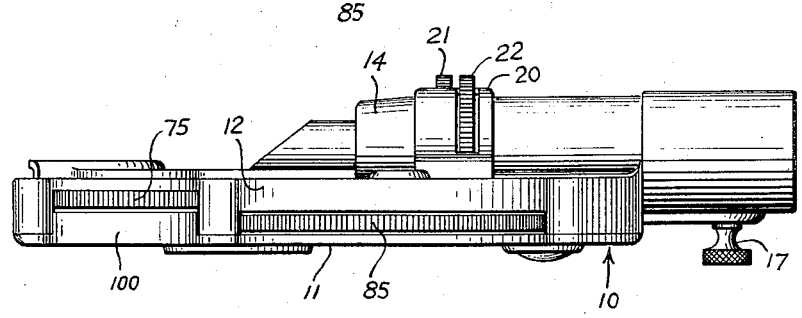
Fig. 2 is a side view of the same device.
Figure 3:
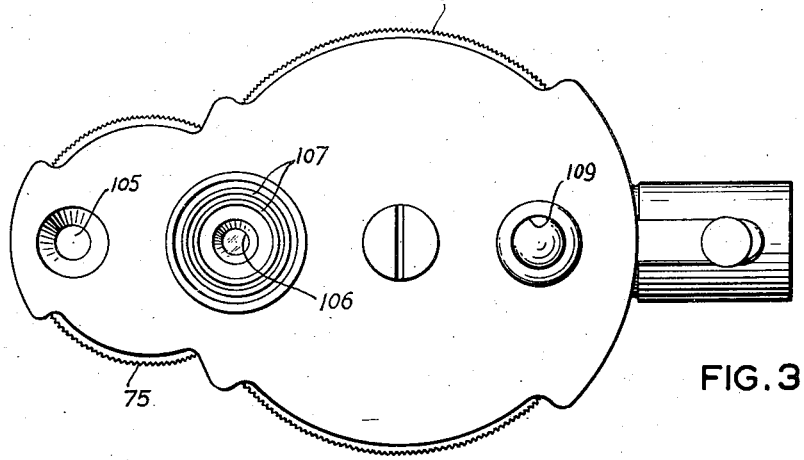
Fig. 3 is a front view of the device.

Referring now to the drawings, 10 indicates generally a casing for an ophthalmoscope, which casing is made up of a front plate 11 and a rear plate or housing 12. Each of these plates is made of some suitable material, such as a phenol condensation product or other die-cast or molded material having the desired properties. The casing as a whole has the general outline shown in the drawings, and the rear plate or housing 12, in addition to conforming to the general outline of the face plate shown in Fig. 3, has formed integrally therewith a tubular portion 14 for the reception of a light bending and directing member, such as a prism 15, and a continuation of such tubular portion as shown at 16 for the reception of a source of light rays, such as an electric light bulb mounted in a socket. The socket member can be held in place by a thumb screw 17. In addition, a pair of lenses 18 and 19 are retained in the tubular portion 16. Prism 15 is so made as to direct rays of light from the light bulb outwardly substantially at an angle of 90° to the axis of the tubular portions 14 and 16; in use these rays being directed upon the eye of a patient under examination.

Intermediate the tubular portions 14 and 16 is an integral enlargement 20 hollowed out to form a chamber for the reception of two overlapping composite wheels or discs 21 and 22. This enlargement 20 has openings 24 and 25 therein, through which portions of the peripheries of the discs 21 and 22 extend. The peripheries of these discs are milled to aid in manipulating the same. The chamber which is formed by hollowing out the enlargement 20, is open at the inner surface of the housing 12 for introduction of the two discs 21 and 22, along with a mount member which supports these discs within the chamber. The mount is shown in Figs. 12 to 14, inclusive, being made up of suitable thin spring metal to have a flat part 25 centrally apertured as at 26. In addition this part 25 has two opposite apertures 27 and 28. Extending outwardly in each direction from one edge of the part 25 are two ears 29 and 30 disposed at right angles to the part 25. The respective ears 29 and 30 have openings 29' and 30' therein. Depending from the ears 29 and 30 are spring stop members 31 and 32. The ends of these members 31 and 32 are substantially cup-shaped, as shown at 34 and 35, for a purpose to be described later.

The composite disc 21 is made up of a thin metal disc 40 and a thicker disc 41, preferably of some suitable thermoplastic material, but which can be of metal or other suitable material. The disc 41 is provided with four openings 42 while the disc 40 has three notching openings 42' and a slot 43 arranged diametrically of the other opening 42 of disc 41. If desired, filters for various colors can be clamped between the two discs 40 and 41 to fill selected openings 42, one of such openings, however, being unobstructed by a filter or any other extraneous material. In order that these two discs may be secured together, the metal disc 40 has two openings 44 in diametrically opposite disposition to fit around the short studs 45 formed integrally with the disc 41. Since this dics 41, and consequently the studs 45, are preferably of thermoplastic material, these studs may be spread outwardly by a hot die or the like to flow the material of the studs over the edges of the openings 44 sufficiently to lock these two discs together. If disc 41 and studs 45 are of metal, the studs can be formed over in a similar manner by a pressure die. A short metallic shaft 46 extends through the composite disc and is nonrotatable relative thereto.

The other composite disc 22 is made up in a similar manner of a metallic or plastic disc 48 and a second disc similar to the disc 41 but not shown in detail in Fig. 16. The thicker disc of the assembly 22 is provided with four openings similar to the openings 42 previously described. However, the thinner disc 48 is provided with only one opening 49 of diameter approximating that of the opening in the thicker disc, while a second opening 50 is of smaller diameter than the aligned opening in the thicker disc, and a third opening 51 is of still smaller diameter than its aligned opening. In addition, a narrow slot 52 is provided to align with a diameter of the fourth opening in the thermoplastic disc. This thinner disc 48 has openings 54 therein similar to the openings 44, and the companion thicker disc has studs 55 similar to studs 45 for locking the two discs in assembly. A shaft 56 is likewise provided. When slots 43 and 52 are brought into the line of light travel, they cross each other at right angles.

The parts comprising this disc and the mount assembly can be located in the chamber in the enlargement 20 in the following manner: The disc 21 is so positioned relative to the mount that the longer end of shaft 46 extends through the opening 27, with the cup-shaped part 34 bearing against the exposed surface of the thicker disc 41. In this condition the spring 31 is flexed toward the spring 32, but will be perpendicular to the two ears 29 and 30 if the cup 34 is in engagement with one of the openings 42. Likewise the disc 22 is assembled by having its shaft 56, extending through the opening 28 with the exposed surface of the thicker disc engaging the cup-shaped stop member 35. When these parts are so assembled with the thicker disc portions thereof opposing each other and with the springs 31 and 32 under tension, the mount and discs can be introduced into the chamber of the enlargement 20 and forced thereinto until the ears 29 and 30 contact the inner surface of the housing 12, which is recessed to receive the same, and which is provided with short studs to enter the openings 29' and 30'. When so positioned in this housing, the springs 31 and 32 can expand within limits to hold the disc in assembly with the part 25, and in addition the cup-shaped parts 34 and 35 act as opposing stops to assure that one of the openings 42 of disc 21 and one of the openings 49, 50, 51 or 52 of the disc 22 is in alignment with the tubular parts 14 and 16 of the housing. These two discs can be rotated selectively and independently to align the various filters of the disc 21 with these tubular parts of the housing to effect the normal variation in light directed outwardly by the prism 15, as is the result obtained by color filters, and also to vary the character of the light in accordance with the four openings in the disc 22. Various combinations, of course, are possible with these discs.

Figure 4:
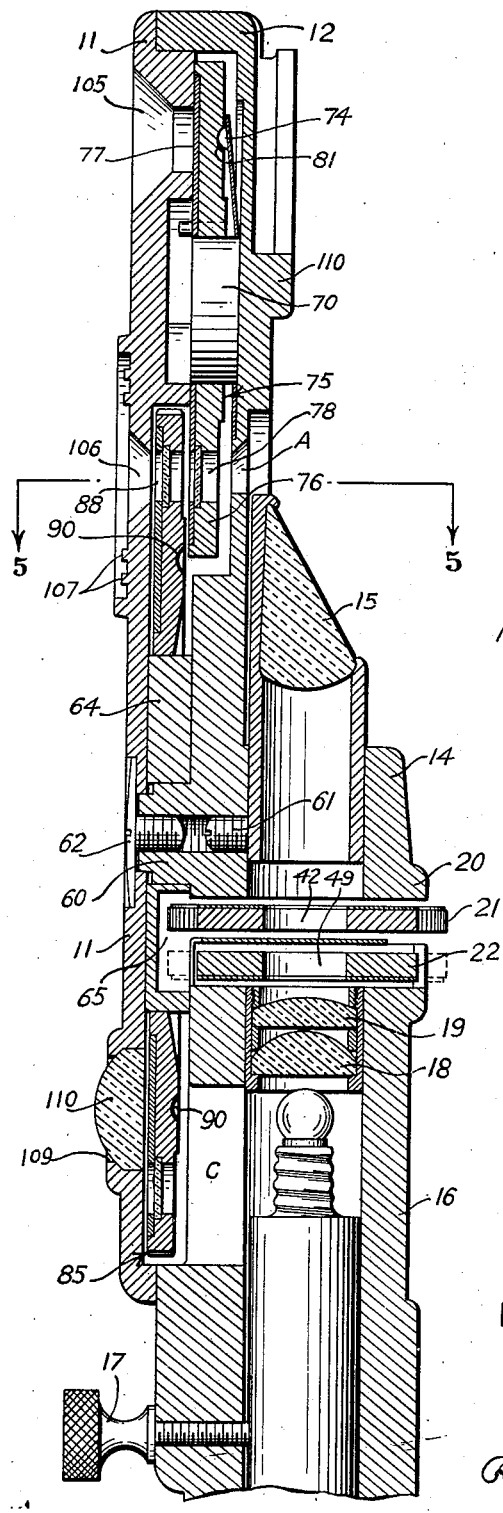
Fig. 4 is an enlarged section taken substantially on the line 4—4 of Fig. 1.
Figure 5:
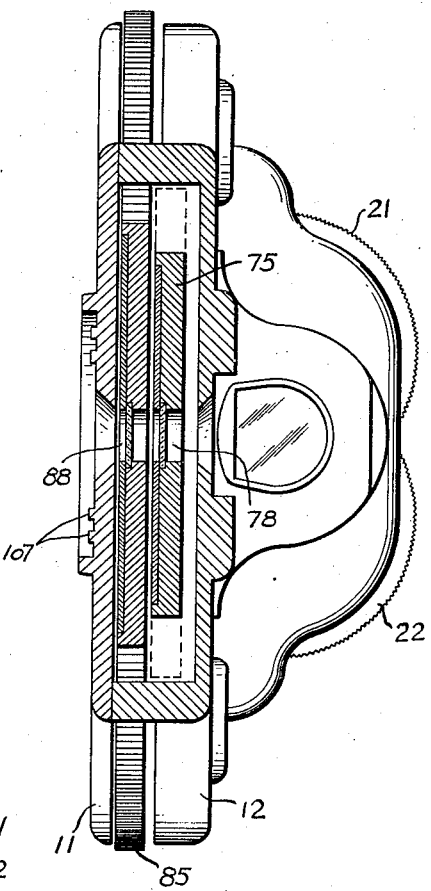
Fig. 5 is a section taken substantially on the line 5—5 of Fig. 4.
Figure 9:
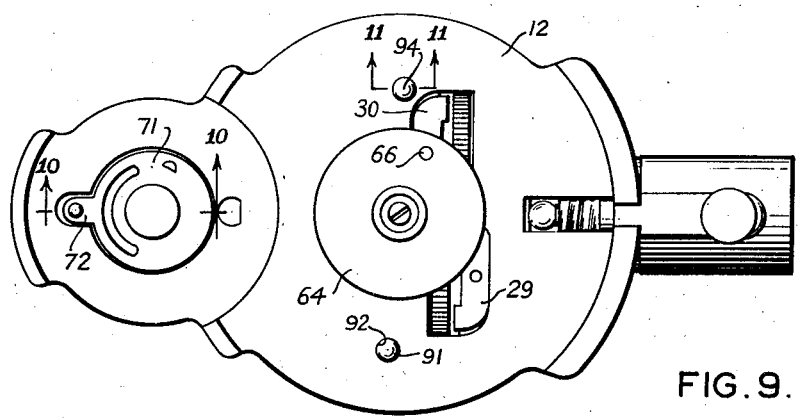
Fig. 9 is a view of parts of the mechanism in assembly with the housing member prior to the addition of the lens discs.

The housing 20 has a stud 60 extending from the inner surface thereof, which stud is apertured and internally threaded. A short screw member 61 threaded into this aperture serves to retain the mount for the prism 15 in proper position in the tubular part 14 of the housing. A second screw 62 can be used in a manner to be described later, such second screw being likewise threaded into this aperture, but is of such length as to stop short of the screw 61. Fitting around the stud 60 is a metallic washer 64 which is in effect a hub for a lens disc in a manner to be described later. Washer 64 is recessed in the undersurface thereof, as at 65, to clear the peripheries of the discs 21 and 22, as shown in Fig. 4. Proper location of the washer 64 is assured by an opening 66 therein, which fits over the stud which passes through the opening 30' in the ear 30. Thus rotation of the washer is prevented and proper location of the recess 65 is assured. By reference to Fig. 9 of the drawings it will be seen that the washer 64 has a portion overlying the opening into the disc chamber, which portion effectively retains the disc mount and the discs within this chamber, such retention being assured by contact of portions of the washer 64 with the ears 29 and 30 of the disc mount.

Immediately above the top of the prism 15 the housing 12 is provided with a through opening A, the bottom edge of which is flattened to correspond with the flat top of the prism mount. Above this opening A the housing 12 has an integral stud 70, and the inner surface is slightly recessed surrounding this stud to receive a metallic member 71 which is circular for the major portion but which has a lip 72 extending therefrom. A bead 74 is formed on this lip 72. The upper part of the housing from which the stud 70 extends is thinner than the part from which the stud 60 extends, so that a lens disc 75 positioned around the stud 70 does not extend beyond the lower part of the housing, since a second lens disc must be positioned around the stud 60 in overlapping relation to the disc 75. The disc 75 is made up of a relatively thick disc 76 of suitable thermoplastic material, metal, or other suitable material, and a second thin disc 77 of similar material. These two discs are provided with a plurality of matched openings 78 and filters of conventional character, or lenses of suitable dioptric value can be held between the two discs 76 and 77 to fill the various openings 78.

Figure 6:
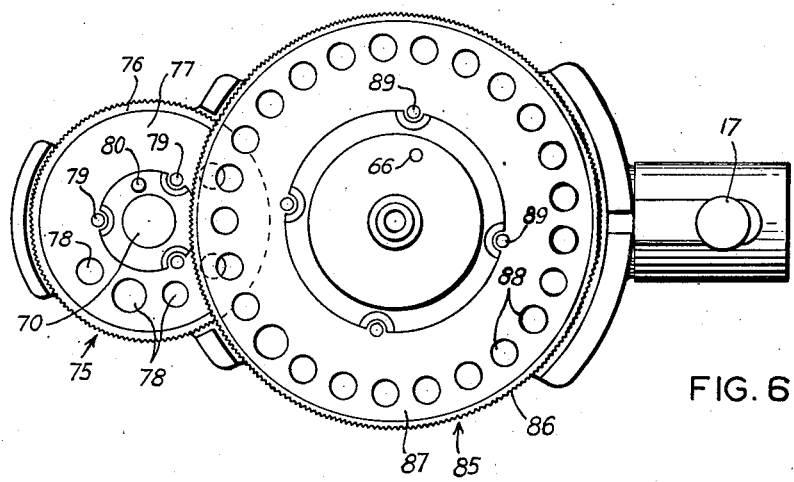
Fig. 6 is a view, with the cover plate removed, of the two lens discs disposed in the housing.
Figure 7:
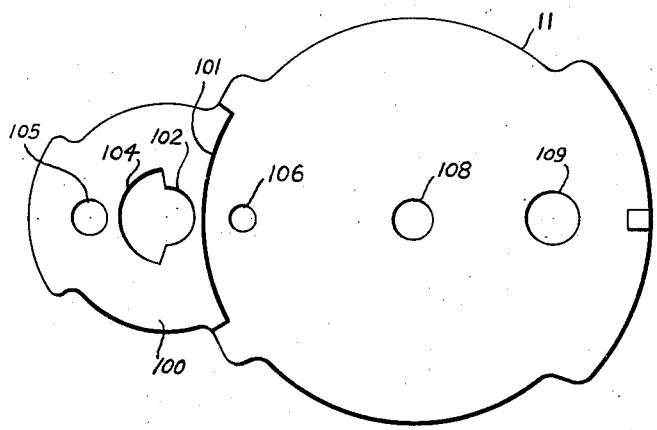
Fig. 7 is a view of the inner surface of the cover plate.
Figures 19, 20:
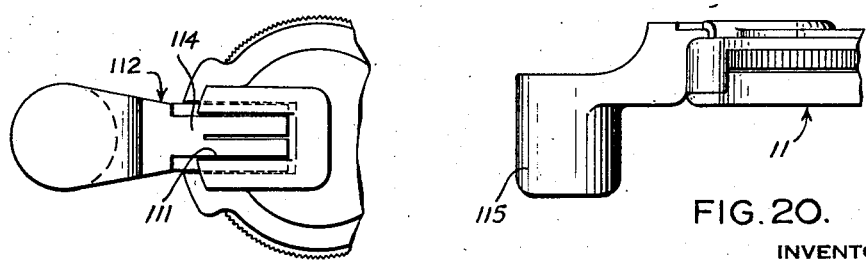
Fig. 19 is a fragmentary view of the back of the instrument showing the manner in which a brow support can be assembled therewith.
Fig. 20 is a side view of the same part of the instrument.
Figure 8:
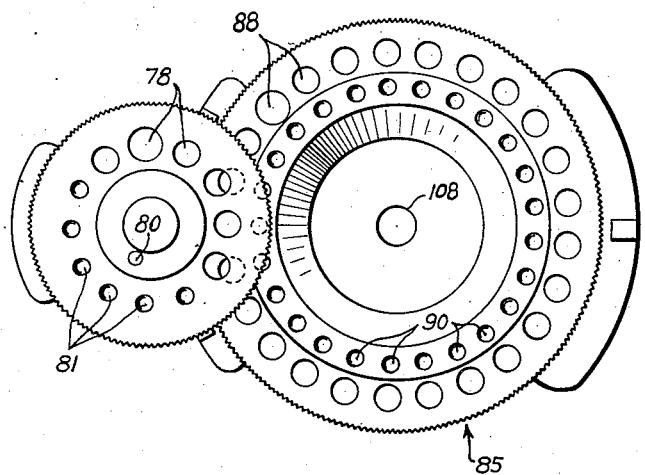
Fig. 8 is a view of the same two discs shown in Fig. 6 but from the opposite sides thereof.

The two discs 76 and 77 are held together in the manner described in connection with discs 20 and 21, i. e., the disc 77 has three openings 79 therein through which extend pins integral with the disc 76, which pins can be spread over the edges of the openings 79 by a hot punch or similar tool. The composite disc 75 has a pin 80 extending from the front surface thereof (Fig. 6), and on this front surface a number of indicia are disposed in opposite relation to their respective openings 78 to indicate to an operator the filter or lens which has been aligned with the through opening A in the housing member. The undersurface of the disc 76 is provided with a plurality of indentations 81 (Fig. 8) which are adapted to be engaged selectively with the bead on the spring lip 72, which engagement forms a spring stop to properly position the various openings 78 in alignment with the through opening A.

A second or major lens disc assembly, indicated generally at 85, is made up of a relatively thick disc member 86 and a thin disc member 87. These two disc members have a plurality of openings 88 therein in matched disposition, and lenses of various dioptric values can be secured between the two discs in register with the various openings 88. The periphery of disc 85 is knurled in the same manner as the periphery of disc 75 to aid in manipulation of the two discs. The two component members 86 and 87 are secured together in the manner previously described in connection with the other discs, i. e., the disc 87 has a plurality of openings 89 therein to receive short pins or pegs integral with the disc 87, which pins or pegs can be spread over the edges of the openings 89 by a hot punch or other tool to fasten the part securely together.

Figures 10, 11:
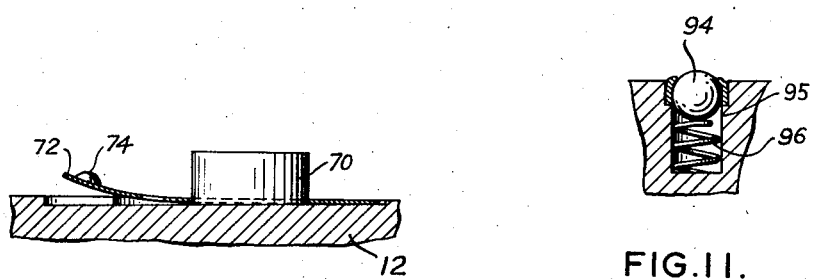
Fig. 10 is an enlarged section taken substantially on the line 10—10 of Fig. 9.
Fig. 11 is an enlarged section taken substantially on the line 11—11 of Fig. 9.

In the under-surface of the disc 86 are a plurality of identations 90 which are adapted to be engaged selectively by a ball 91 retained in an opening 92 in the inner surface of the housing 12, which ball is pressed upwardly by a suitable spring. A second ball 94 is located in a similar opening 95 in the housing 12, being pressed upwardly by a spring 96 (Fig. 11). Inasmuch as these two arrangements are of similar nature, only the arrangement, including the ball 94, has been shown in section. It will be noted from inspection of Fig. 9 that the ball 94 is located closer to the axis of the washer 64 than the ball 91, so that the ball 94 will not engage the indentations 90 but will engage the under-surface of the lens disc 85 inwardly of those openings. The two spring-pressed balls 91 and 94 are in substantially diametric opposite disposition so that they serve to balance the lens disc 85 and prevent tilting thereof with consequent wear as would be the case if only the single ball 91 were employed.

The face plate 11 is provided at one end with a thickened portion 100, the inner edge of which is curved as at 101, so that the thickened portion can be assembled to approach the disc 75 while the thinner part or major portion of the plate 11 approaches the main lens disc 85. The plate is locked in place by the screw 62 before-mentioned, which is in threaded engagement with the apertures in the stud 60. The inner surface of the face plate 11 has a recess in the part 100 which is drawn on two radii as shown at 102 and 104, with shoulders connecting these two parts. The smaller part 102 closely surrounds the stud 70, while the part of larger radius 104 receives the pin 80, with the shoulders acting as stops to limit movement or rotation of the disc 75. A through opening 105 serves to make visible to an operator the various indicia on disc 75, while a second through opening 106 is so disposed as to be in alignment with the opening A in the housing 12. A plurality of concentric ribs 107 (Figs. 3 and 4) surround this opening 106 in the outer surface of the plate. A third opening 108 permits passage of the shank of the screw 62, while a fourth opening 109 is so disposed as to lie in the path of various indicia on the lens disc 85. The two component parts of this disc 85 may be made of translucent thermoplastic material, and the indicia thereon may be opaque, with the result that light from the source of rays in the tubular part 16 can pass through the channel C and illuminate these indicia sufficiently to be visible to an operator through the opening 109. A lens 110 may be mounted in opening 109, if desired.

The outer surface of the housing 12 is provided near the top of the instrument with an enlargement 110 which has a portion thereof so cut away as to provide a slideway 111. In conjunction with this slideway use may be made of a brow rest 112 which has a slide portion 114 to resiliently fit in the slideway 111. The brow rest 112 has an angularly extending part 115 which extends beyond the front plate 12 and toward an operator an amount sufficient for its intended purposes, i. e., to space the instrument from the eyes of an operator by contact between the rest 115 and the brow of the operator. It will be understood, however, that other accessories having properly shaped parts can be inserted into the slideway 111.

From the foregoing it will be seen that the present invention provides a new and simplified ophthalmoscope which possesses many advantages over prior instruments. It will be understood that modifications can be made therein beyond the illustrated embodiment, and consequently any limitations imposed upon the invention are to be only those set forth in the following claims.

I claim:

1. In a diagnostic instrument, a housing member having wall portions defining aligned channels for the reception of a source of light rays and of a light bending and directing member, said wall portions being laterally extended and enlarged to provide a chamber intermediate the source of light rays and the light bending and directing member, and a pair of overlapping members in said chamber, said overlapping members being rotatable about their center axes located in spaced relation in said chamber, said overlapping members having a plurality of devices movable selectively by rotation of said overlapping members into the path of rays of light traveling from said source to said light bending and directing member for varying the character of light rays directed by said member, the wall portions of said chamber being apertured for the passage of peripheral portions of said rotatable members.

2. In a diagnostic instrument, a housing member having wall portions defining aligned channels for the reception of a source of light rays and of a light bending and directing member, said wall portions being laterally extended and enlarged to provide a chamber intermediate the source of light rays and the light bending and directing member, and a pair of overlapping members in said chamber, said overlapping members being rotatable about their center axes located in spaced relation in said chamber and laterally displaced from the axis of said channels, said overlapping members each having a plurality of devices movable selectively by rotation of said overlapping members into the path of rays of light traveling from said source to said light bending and directing member for varying the character of light rays directed by said member, the wall of said chamber being provided with staggered apertures for the passage of portions of the peripheries of each of said rotatable members with the major portions of each of said rotatable members constantly enclosed in said chamber.

3. In a diagnostic instrument, a housing member having aligned channels for the reception of a source of light rays and of a light bending and directing member, said housing having an enlargement providing a chamber intermediate the source of light rays and the light bending and directing member, and a pair of overlapping members in said chamber, said overlapping members being rotatable about their center axes located in spaced relation in said chamber, and overlapping members having a plurality of devices movable selectively by rotation of said overlapping members into the path of rays of light traveling from said source to said light bending and directing member, a single mount for said rotatable members, said mount and said rotatable members having cooperating formations affording relative rotation therebetween, said rotatable members rotatably engaging said mount, means for releasably retaining said mount and said rotatable members in said chamber and means for selectively holding said rotatable members in predetermined overlapping relationship.

4. In a diagnostic instrument, a housing member having aligned channels for the reception of a source of light rays and of a light bending and directing member, said housing having an enlargement providing a chamber intermediate the source of light rays and the light bending and directing member, and a pair of overlapping rotatable members in said chamber, said members having a plurality of devices movable selectively into the path of rays of light traveling from said source to said light bending and directing member, and a mount for said rotatable members, said mount having means for selectively holding said rotatable members in predetermined overlapping relationship, said mount having oppositely disposed ears limiting movement of the mount and rotatable members into said chamber.

5. In a diagnostic instrument, a housing member having aligned channels for the reception of a source of light rays and of a light bending and directing member, said housing having an enlargement providing a chamber intermediate the source of light rays and the light bending and directing member, and a pair of overlapping rotatable members in said chamber, said members having a plurality of devices movable selectively into the path of rays of light traveling from said source to said light bending and directing member, and a mount for said rotatable members, said mount having a flat portion apertured to receive shafts of said rotatable members and having integral spring portions to resiliently engage formations of said rotatable members.

6. In a diagnostic instrument, a housing member having aligned channels for the reception of a source of light rays and of a light bending and directing member, said housing having an enlargement providing a chamber intermediate the source of light rays and the light bending and directing member, and a pair of overlapping rotatable members in said chamber, said members having a plurality of devices movable selectively into the path of rays of light traveling from said source to said light bending and directing member, and a mount for said rotatable members, said mount having a flat portion apertured to receive shafts of said rotatable members and having integral spring portions to resiliently engage formations of said rotatable members, said mount having oppositely disposed ears limiting movement of the mount and rotatable members into said chamber.

7. In a diagnostic instrument, a housing member having aligned channels for the reception of a source of light rays and of a light bending and directing member, said housing having an enlargement providing a chamber intermediate the source of light rays and the light bending and directing member, a mount, and a pair of members supported by said mount in said chamber, said members being rotatable about their center axes located in spaced relation in said chamber, said members having a plurality of devices movable selectively by rotation of said members into the path of rays of light traveling from said source to said light bending and directing member, one surface of said enlargement being apertured for parts of the peripheries of said rotatable members, the other side of said enlargement being open for the introduction and withdrawal of said rotatable members and said mount therefor as a unit.

8. In a diagnostic instrument, a housing member having aligned channels for the reception of a source of light rays and of a light bending and directing member, said housing having an enlargement providing a chamber intermediate the source of light rays and the light bending and directing member, and a pair of rotatable members in said chamber, said members having a plurality of devices movable selectively into the path of rays of light traveling from said source to said light bending and directing member, one surface of said enlargement being apertured for parts of the peripheries of said rotatable members, the other side of said enlargement being open for the introduction of said rotatable members and a mount therefor, said mount having a flat part apertured to receive shafts of said rotatable members which are disposed on opposite sides of the flat part, spring means integral with said flat part and engaging formations of said rotatable members, said mount having oppositely extending ears to engage the surface of said enlargement adjacent the opening therein, said ears and said surface having cooperating location formations.

9. In an ophthalmoscope, a housing, a multiple lens disc rotatably mounted therein, said lens disc having a plurality of formations in one surface thereof arranged in circular fashion and coordinated with the lenses of said disc, means mounted in said housing for engaging said formations selectively, and oppositely disposed means mounted in said housing for engaging a smooth part of the said one surface of said disc in a circle of radius different from but close to the radius of the circle of formations.

10. In an ophthalmoscope, a housing, a multiple lens disc rotatably mounted in said housing, one side of said lens disc being provided with a plurality of indentations arranged in circular fashion and coordinated with the lenses of said disc, a ball mounted in said housing and resiliently forced toward said disc for selective engagement with said indentations, and a second ball mounted in said housing and spring-pressed toward said disc, said second ball being oppositely disposed from the first ball and engaging a smooth part of the said one surface of said disc in a circle of radius different from but close to that of said indentations.

11. In a diagnostic instrument, a housing member having aligned channels for the reception of a source of light rays and of a light bending and directing member, said housing having an enlargement providing a chamber intermediate the source of light rays and the light bending and directing member, said housing having an opening in one side thereof providing access to said chamber, supporting means for rotatably mounting a pair of overlapping members in said chamber, said members each having a plurality of devices movable selectively into the path of rays of light traveling from said source to said light bending and directing member for varying the character of light rays directed by said member, said enlargement being apertured for the passage of portions of the peripheries of each of rotatable members, and means for retaining said supporting means and said rotatable members in said chamber.

12. In a diagnostic instrument, a housing member having aligned channels for the reception of a source of light rays and of a light bending and directing member, said housing having an enlargement providing a chamber intermediate the source of light rays and the light bending and directing member, said housing having an opening in one side thereof providing access to said chamber, supporting means for rotatably mounting a pair of overlapping members in said chamber, said members each having a plurality of devices movable selectively into the path of rays of light traveling from said source to said light bending and directing member for varying the character of light rays directed by said member, a closure member part of which closes said opening to retain said supporting means and said rotatable members in said chamber, and a lens disc secured to said housing and rotatable about said closure member as a hub, said enlargement being apertured for the passage of portions of the peripheries of each of said rotatable members.

13. In a diagnostic instrument, a housing member having aligned channels for the reception of a source of light rays and of a light bending and directing member, said housing having an enlargement providing a chamber intermediate the source of light rays and the light bending and directing member, said housing having an opening in one side thereof providing access to said chamber, an assembly of mount and a pair of overlapping rotatable members, said assembly being movable into and out of said chamber through said opening, means for positioning said assembly in a predetermined position relative to said aligned channels, said members each having a plurality of devices movable selectively into the path of rays of light traveling from said source to said light bending and diecting member for varying the character of light rays directed by said member, and means for retaining said assembly in said chamber, said enlargement being apertured for the passage of portions of the peripheries of each of said rotatable members.

14. In an ophthalmoscope, a pair of plates comprising a housing having a sight opening, a multiple lens disc rotatably mounted in said housing between the plates, one of said plates having an integral formation on the outer surface thereof and above said sight opening, said formation forming the walls of a slide-way for the reception of an accessory made up of a split slide portion to resiliently engage said walls, an angular portion extending across the top of said housing, and a spacing portion extending beyond the outer surface of said housing to engage the brow of an operator of the instrument.

15. In an ophthalmoscope, a pair of plates comprising a housing having a sight opening, a stud extending from the inner surface of one of said plates, a multiple lens disc rotatable about said stud as a hub, a thin metallic bearing washer interposed between one surface of said disc and the inner surface of the plate having the stud extending therefrom, one surface of said disc being provided with indentations coordinated with the lenses carried by the disc, and an outwardly biased resilient spring lip formation extending radially from said washer and having a bead near the end thereof for selective engagement with said indentations to align lenses carried by said disc with said sight opening.

WALTER A. ARNESEN.